Patented July 13, 1937

2,086,843

UNITED STATES PATENT OFFICE 2,086,843

ANTHRAQUINONE ACRIDONE CARBAZOLES

Wilhelm Bauer, Leverkusen-Wiesdorf, Germany, assignor to General Aniline Works, Inc., New York, N. Y., a corporation of Delaware No Drawing. Application April 24, 1935, Serial No. 18,077. In Germany May 5, 1934

10 Claims. (Cl. 260—37)

This invention relates to new dyestuffs of the anthraquinone series and to a process of preparing the same.

German Patent 258,808 describes a process of condensing by means of concentrated sulfuric acid an anthraquinone-acridonyl-amino-anthraquinone obtained from alpha-amino-anthraquinone and a halogenanthraquinone-acridone, in which the halogen is para to the heterocyclic nitrogen. The process described in U. S. Patent 1,787,069 to Gubelmann and Goodrich differs therefrom in two respects, namely (1) Gubelmann and Goodrich operate on an anthraquinone-acridonyl-aminoanthraquinone obtained from an alpha-aminoanthraquinone and a monoor dihalogen anthraquinone acridone in which at least one halogen atom is in meta-position to the heterocyclic nitrogen and (2) they use metal chlorides such as aluminium chloride or zinc chloride as the condensing agent.

The said process probably results in the formation of coeramidonines, one of the theoretically possible isomers of the Gubelmann patent being represented by the following formula:—

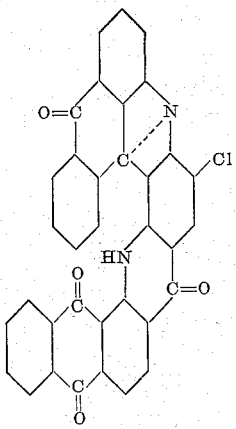

However, Gubelmann states that it is also possible that the reaction results in the formation of a carbazole ring structure in which case the formula of the product would be as follows:—

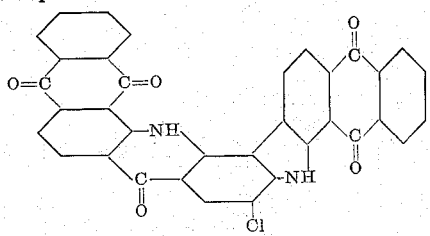

At any rate, my experiments have proved that when working as described in the examples of U. S. Patent 1,787,069 i. e. by mere heating the starting materials in question with anhydrous aluminium chloride or zinc chloride impure products are obtained which eventually represent mixtures, the essential part of which are coeramidonines. These products are described in the Gubelmann patent as "readily soluble in concentrated sulfuric acid, imparting a brown color to the solution and in alkaline hydrosulfite, giving a violet colored vat".

As described in my co-pending application Serial No. 1,819 of January 14, 1935, I have found that uniform condensation products of anthraquinone-2.1-(N)-benzene or naphthalene acridones, which have an 1-aminoanthraquinone residue in the benzene or naphthalene nucleus are obtained by the action of substantially anhydrous acid condensing agents, such as sulfuric acid monohydrate, chlorosulfonic acid, aluminium chloride and the like if the 1-aminoanthraquinone residue contains an aroylamino group in 4-, 5- or 8-position. These products are uniform compounds and probably correspond to the carbazole type. The process described in my prior application can only be applied to a specific class of compounds and it is, therefore, a problem to find a condensing agent which can generally be employed for the preparation of uniform carbazoles of the character described.

In accordance with the present invention this problem has been solved by the employment of aluminium halogenides or ferric halogenides in combination with such non-basic organic solvents as are capable of dissolving said metal chlorides. The object of my present invention is, therefore, to cause condensing agents of the character described to react upon anthraquinone-2.1-(N)-benzene acridones, which have an 1-amino-anthraquinonyl residue in 6-position of the benzene nucleus in the presence of organic solvents of the character described, and subjecting the hydro products, which may be formed as intermediates to the action of oxidizing agents. The said oxidizing operation can be dispensed with in most cases if ferric chloride is employed as condensing agent as the latter exerts an oxidizing action at the same time, whereas a subsequent oxidizing operation is preferable in case aluminium chloride is employed for the condensation.

As stated above, my new process can be applied generally to anthraquinone-2.1-(N)-benzene acridones, in the benzene nucleus of which the hydrogen atom, which is adjacent to the carbonyl of the acridone is replaced by a 1-amino-anthraquinonyl residue. Obviously, the nuclei may contain various substituents, such as alkyl groups, alkoxy groups, aroylamino groups, halogen atoms and the like without departing from the sense of my invention. Furthermore, it is possible to employ as starting materials in my new process the products of the condensation of alpha-alphadiaminoanthraquinone such as an 1.5-diaminoanthraquinone with 2 mols of a Bz-6-halogenanthraquinone acridone and such compounds are intended to fall within the scope of my claims. However, the nuclei must not contain substituents which prevent ring closure in the 5-position of the benzene nucleus or in the 2-position of the anthraquinonyl residue; it may be pointed out that a halogen atom in the 5-position of the benzene nucleus does not prevent ring closure as it is eliminated during the reaction in the form of hydrogen chloride. The present process permits one to work at slightly elevated temperature and proceeds so rapidly that any saponifiable groups present in the molecule, for example, alkoxy or aroylamino radicals are not split up. I wish to point out in this connection that halogen atoms and alkoxy groups in 3- and/or 4-position of the benzene acridone nucleus and in any desired position of the 1-aminoanthraquinone nucleus particularly in the 6- and/or 7-position yield especially valuable products as substituents of the character described have the common capacity of improving the fastness properties, and the clearity and tints of shades of the final products of the reaction. As pointed out above the characteristic feature of my new process resides in the fact that aluminium chloride and ferric chloride are not employed per se but in combination with non-basic organic solvents, which are capable of dissolving said metal chlorides while forming addition products of the type $AlCl_3.C_6H_5NO_2$; $AlCl_3.2C_6H_5NO_2$; $FeCl_3.C_6H_5NO_2$; $AlCl_3.C_6H_5Cl$ and the like. As examples for these non-basic organic solvents, there may be mentioned nitrobenzene, nitrotoluene, dinitrobenzene, chlorinated aliphatic hydrocarbons, such as, tetrachloroethane, chlorinated aromatic solvents, such as, chlorobenzene and the like. The anthrimides quickly dissolve in these solvents at about 50° C. to 60° C. while showing a spontaneous rise of temperature in some cases. The condensation starts at about 60° C. to 90° C. in most cases and is finished within about ½ to 1 hour. The reaction occurs at such mild conditions and so rapidly that any saponifiable groups present in the molecule such as methoxy or benzoylamino groups are not saponified and that uniform compounds of the carbazole type are obtained. In case hydro compounds, i. e. compounds of a higher hydrogen content are formed as intermediates, I prefer to employ as oxidizing agents oxygen, sodium hypochlorites, alkali metal nitrites, ferric salts, manganese dioxide and the like.

Contrary to the products described in the Gubelmann patent above referred to, the products which are obtainable in accordance with my present invention are uniform. As part of them is described and claimed in my co-pending application Serial No. 1,819 of Jan. 14, 1935, I restrict myself to claim the compounds of the following type:—

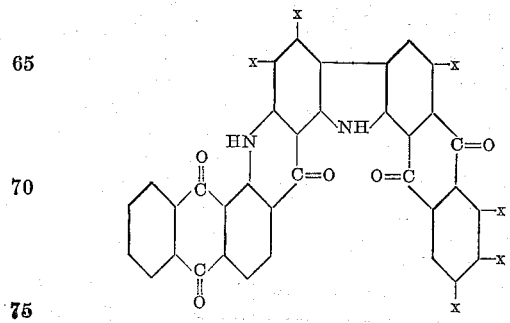

in which formula part of the hydrogen atoms in the positions $x$ may be replaced by halogen atoms, alkyl-, alkoxy- or aryloxy groups. These new products are generally dark powders, insoluble in water, organic solvents, alkalies and mineral acids, difficultly soluble in organic solvents of high boiling point at elevated temperatures. They are characterized by the blue to bluish red coloration obtained upon dissolving the same in concentrated sulfuric acid and by their red-brown hydrosulfite vat, in which vegetable fibres are dyed abundant fast deep shades. If desired, the tint of the dyestuffs can be improved by means of the usual brightening agents, for instance, by halogenation. The products are exceedingly suitable for the sodium formaldehyde sulfoxylate-potash printing, for the vat dyeing process and for the dyeing or printing in form of the leuco sulfuric acid esters.

The hydro compounds which may be formed as intermediates are likewise novel and are soluble in sulfuric acid with a blue coloration. These intermediate products are easily capable of being vatted and yield the same deep shades as the carbazoles. They are especially suitable for the sodium formaldehyde sulfoxylate-potash printing as they show a good speed of fixation. They can be defined as hydrocompounds of carbazoles, i. e. as compounds of the following general formula:—

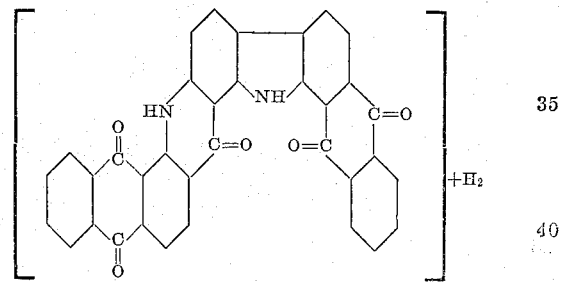

which indicates that the position of the excess hydrogen atoms is unknown; these compounds are characterized by the blue coloration obtained upon dissolving the same in concentrated sulfuric acid, furthermore, they have a small content of aluminium chloride. The simplest method of working up the hydro compounds is by vatting the same by means of alkaline hydrosulfite and then blowing in air so as to form the final products.

The following examples illustrate the invention, without, however, restricting it thereto, the parts being by weight:—

Example 1

39.4 parts of anthraquinone-2.1-(N)-1'.2'-(N)-3'.6'-dichlorobenzene acridone obtainable from 2.5-dichloro-aniline according to the process described in U. S. P. 1,967,364.
25.0 parts of 1-aminoanthraquinone
8.0 parts of finely powdered anhydrous potassium carbonate
1.5 parts of copper acetate
250.0 parts of naphthalene are heated to 210° C. for two hours while stirring. After cooling to 100° C., the reaction mixture is diluted with 280 parts of chlorobenzene, filtered with suction at 60° C., washed with organic solvents in order to remove the mother liquor and washed with dilute hydrochloric acid in order to remove the inorganic salts, then washed with water and dried. The anthrimide obtained is soluble in sulfuric acid monohydrate with a brown coloration. By heating to 100° C. the solution turns orange-red. By diluting it with water a brown orange dyestuff is separated which dyes fibres from a blue vat brown orange shades.

50.0 parts of the above anthrimide are introduced into a solution of
200.0 parts of anhydrous aluminium chloride in
500.0 parts of nitrobenzene at 50° C. while stirring. A green solution is obtained. The reaction is exothermic. When diluted with alcohol a test portion of the solution turns blue. The solution is then heated to 100° C. whereby the color changes to blue black and a test portion of the blue black solution, if diluted with alcohol, turns cherry red. After heating to 100° C. for about half an hour, the melt is poured into ice water to which hydrochloric acid has been added, the nitrobenzene blown off with steam the dyestuff filtered with suction and rinsed until its reaction is neutral. A dried test portion is soluble in sulfuric acid with a blue coloration. The dyestuff is stirred with water to a paste, 14 parts of caustic soda lye and a slight excess of sodium hypochlorite solution are added, the mixture is stirred for another two hours, filtered with suction, rinsed and dried.

The product thus obtained, which corresponds to the following formula:—

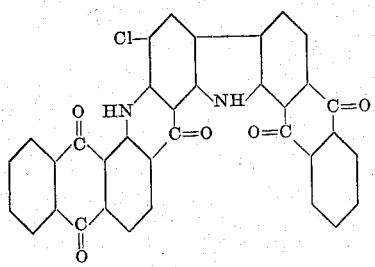

forms a dark powder which is insoluble in organic solvents. Its solution in concentrated sulfuric acid shows a cherry red coloration. By the action of an alkaline reacting hydrosulfite solution there is obtained a red brown vat, from which after oxidation vegetable fibers can be dyed reddish brown shades of excellent fastness properties.

If chlorobenzene is employed as solvent for aluminium chloride in the above example instead of nitrobenzene and the melt is heated to 120° C. for about 40 minutes and worked up as described above, a dyestuff is obtained which is also soluble in concentrated sulfuric acid with a cherry red coloration and dyes fibers from a brown red vat yellowish brown shades.

*Example 2*

37.35 parts of anthraquinone-2.1-(N)-1'.2-(N)-3'-methyl-6'-chlorobenzene - acridone, obtained by causing 4-chloro-2-aminotoluene to react with 1-chloroanthraquinone-2-carboxylic acid and heating the 2'-methyl-5'-chloro-1-anilido-anthraquinone-2-carboxylic acid formed to 150° C. for 1 hour with benzoyl chloride.

25.0 parts of 1-aminoanthraquinone
8.0 parts of finely powdered anhydrous potash
1.5 parts of copper acetate
400.0 parts of naphthalene are heated to 210° C. for two and a half hours while stirring. The melt is worked up as described in Example 1. The anthrimide formed is soluble in sulfuric acid monohydrate with a dark brown coloration, which, by heating to 90° C. gradually changes to orange red.

50 parts of the above anthrimide are introduced into a solution of
150 parts of anhydrous aluminium chloride in
450 parts of nitrobenzene at 60° C. while stirring. The reaction is exothermic and the temperature rises to 80° C., the solution being stirred at this temperature for half an hour longer. The coloration of the solution thereby turns to green blue and a dark precipitate is separated on diluting a test portion of the solution with alcohol, whereby the solution assumes a red violet coloration instead of a blue one. The melt is then introduced into ice water with the addition of some hydrochloric acid, the nitrobenzene is blown off by means of steam and the dyestuff filtered with suction and rinsed until its reaction is neutral. The dyestuff dissolves in concentrated sulfuric acid with a blue coloration. It is ground with water and 7 parts of caustic soda lye of 35% strength and stirred for two hours with sodium hypochlorite solution in small excess. It is then filtered with suction, rinsed and dried. The dyestuff obtained forms a black brown powder which is sparingly soluble in organic solvents. It dissolves in concentrated sulfuric acid with a cherry red coloration. Together with alkaline hydrosulfite solution there is obtained a red brown vat, from which it dyes vegetable fibers after oxidation deep brown shades of excellent fastness properties.

If instead of aluminium chloride 150 parts of anhydrous aluminium bromide are used, the reaction is quite the same and the dyestuff obtained dyes from a brown vat quite similar deep brown shades.

*Example 3*

39 parts of anthraquinone-2.1-(N)-1'.2'-(N)-3'-methoxy-6'-chlorobenzene acridone (obtainable by causing 2-methoxy-5-chloraniline to react with 1-chloroanthraquinone - 2 - carboxylic acid, and heating the 2'-methoxy-5'-chloro-1-anilido-anthraquinone-2-carboxylic acid thus obtained with benzoyl chloride to 130 to 160° C. for about two hours in the manner described in Example 2)

24.00 parts of 1-aminoanthraquinone
7.00 parts of finely powdered dry potash
2.25 parts of copper acetate
400.00 parts of naphthalene are heated to 210° C. for two hours while stirring. The melt is worked up in the manner described in Example 1. The anthrimide thus obtained forms a dark brown crystalline powder, which is soluble in sulfuric acid monohydrate with a yellow brown coloration. On heating in a water bath the solution turns dark red. On pouring into water a yellow red dyestuff is separated.

50 parts of the above anthrimide are introduced into a solution of
150 parts of anhydrous aluminium chloride in
400 parts of nitrobenzene at 60° C. while stirring, whereby the temperature rises to 65° C. Stirring is continued at 80° C. until a test portion of the solution on diluting with alcohol turns violet red, and this coloration lasts for about a quarter of an hour. The solution is then poured into water to which hydrochloric acid has been added, whereupon the nitrobenzene is blown off by steam. The dyestuff is filtered off with suction, rinsed until its reaction is neutral, ground with water to form a paste, rendered alkaline by adding sodium hydroxide lye, mixed with a slight excess of sodium hypochlorite solution, stirred for one hour, filtered off with suction, rinsed and dried. It forms a dark brown powder which is nearly insoluble in organic solvents but easily soluble in concentrated sulfuric acid with a cherry red coloration. It dyes vegetable fibers from its red brown alkaline hydrosulfite vat after oxidation fast olive brown shades.

*Example 4*

50 parts of the anthrimide employed in Example 1 and obtained from anthraquinone-2.1-(N)-1'.2'-(N)-3'.6'-dichlorobenzene acridone and 1-aminoanthraquinone are introduced into a solution of 250 parts of anhydrous ferric chloride in
600 parts of dry nitrobenzene at 40° C. The temperature rises to 55° C. The color of the solution turns brown red. The temperature is then raised to 80° C. for a quarter of an hour while stirring. The dark solution, a thin layer of which shows a yellowish brown coloration, is then diluted with double its volume of alcohol, the dyestuff separated is filtered with suction, rinsed and dried.

The dyestuff thus obtained forms a dark powder which is insoluble in organic solvents but soluble in concentrated sulfuric acid at slightly elevated temperatures with a cherry red coloration. It dyes fibers fast reddish brown shades from a red brown hydrosulfite vat.

*Example 5*

37.35 parts of anthraquinone-2.1-(N)-1'.2'-(N)-3'-methyl-6'-chlorobenzene acridone (see Example 2)
28.0 parts of 4-methoxy-1-aminoanthraquinone
8.0 parts of finely powdered anhydrous potash
1.5 parts of copper acetate
400.0 parts of naphthalene are heated to 210° C. for two hours while stirring. The melt is worked up in the manner described in Example 1. The anthrimide thus obtained forms steel blue crystals which are soluble in concentrated sulfuric acid with a dark blue coloration.

5 parts of the said anthrimide are introduced into a solution of
25 parts of anhydrous ferric chloride in
100 parts of dry nitrobenzene at 30° while stirring. The temperature rises by about 15° C. The temperature is then elevated to 70° C. for 15 to 20 minutes while stirring. The dyestuff formed is separated by diluting the red solution with alcohol. It is filtered with suction, rinsed and dried. It forms a dark red powder, which is sparingly soluble in organic solvents but easily soluble in concentrated sulfuric acid with a bluish cherry red coloration. It dyes vegetable fibers from a brown hydrosulfite vat after oxidation fast red brown shades. (The methoxy group is not saponified during the condensation).

*Example 6*

50 parts of the anthraquinone-acridone-3'-methyl-6'-alpha-anthrimide employed in Example 2 are introduced into a mixture of
200 parts of anhydrous aluminium chloride and
1000 parts of tetrachloroethane The mixture is heated to 80° C. for three hours while intensely stirring. The melt is worked up in the manner described in Example 2. The dyestuff thus obtained is the same as that obtained in accordance with Example 2.

*Example 7*

37.35 parts of 2.1-(N)-2'.1'-(N)-3'-methyl-6'-chlorobenzene acridone as employed in Example 2
28.5 parts of 1-amino-5-chloroanthraquinone
8.0 parts of anhydrous potash
1.5 parts of copper acetate
400.0 parts of naphthalene are heated to 210° C. for two and a half hours while stirring. The melt is worked up in the manner described in Example 1. The anthrimide thus obtained forms a dark crystalline powder which is soluble in concentrated sulfuric acid with a yellow brown coloration.

100 parts of the said anthrimide are introduced into a solution of
300 parts of anhydrous aluminium chloride in
900 parts of nitrobenzene at 55° C. The temperature rises to 65° C. The temperature is then elevated to 80° C. for one hour while stirring, whereupon the green solution turns blue-green. On diluting a test portion of the solution with alcohol, the color changes to violet.

The solution is then poured into ice water to which hydrochloric acid is added, the nitrobenzene is blown off with steam and the dyestuff is oxidized with sodium hypochlorite solution and worked up in the manner described in Example 2. The dyestuff thus obtained forms a dark powder, which is soluble in sulfuric acid with a cherry red coloration. It dyes fibers from a brown vat dark red brown shades.

*Example 8*

36 parts of anthraquinone-2.1-(N)-1'.2'-(N)-6'-chloroacridone (obtainable according to U. S. P. 1,967,364, Example 2) are converted into the anthrimide by boiling with
25 parts of 1-aminoanthraquinone
7 parts of potassium carbonate
1.5 parts of copper acetate
200 parts of naphthalene for two hours. The working up is carried out in the manner described in Example 1.

70 parts of the said anthrimide are introduced into a solution of
200 parts of aluminium chloride in
600 parts of nitrobenzene at 50° C. The solution is then stirred for half an hour at 80° C. The solution thus obtained shows a blue green coloration. On diluting a test portion of it with alcohol, the color changes to red. The solution is then introduced into ice water to which hydrochloric acid is added. The dyestuff is then worked up by distillation with steam and then oxidizing it with chlorine lye as above described. It is soluble in concentrated sulfuric acid with a red coloration and dyes fibers red brown from a red vat.

50 parts of the finely powdered dyestuff are suspended in 50 parts of nitrobenzene and 1 part of iodine is added. 50 parts of sulfuryl chloride are then gradually added to the solution. The temperature rises to 30° C. and is then elevated in the course of one hour to 70° C. Gradually the mass grows thicker with evolution of sulfur dioxide and hydrogen chloride. It is then heated for three hours longer to 75° C. The temperature is then elevated for a short time to 120° C. When the evolution of hydrogen chloride has come to an end, the mass is allowed to cool and diluted with one litre of alcohol. The dyestuff separated is filtered with suction, rinsed and dried. It is a brown powder which is soluble in sulfuric acid with a brown red coloration and dyes fibers from a red brown vat brown shades which are yellower than those obtained with the non-chlorinated dyestuff.

Example 9

43 parts of anthraquinone-2.1-(N)-1'.2'-(N)-3'.5'-6'-trichlorobenzene acridone (obtained from 2.4.5-trichloro-aniline according to U. S. P. 1,967,364, Example 4),
25 parts of 1-aminoanthraquinone
7 parts of potassium carbonate
1.5 parts of copper acetate
400 parts of naphthalene
are heated to 210° C. for two hours while stirring. The anthraquinone-acridone-3'.5'-dichloro-6'-alpha-anthrimide formed is worked up and isolated in the manner described in Example 1. It is a dark powder which dyes fibers dull violet from the vat. 100 parts of the anthrimide are introduced into a solution of 400 parts of aluminium chloride in 1000 parts of nitrobenzene at 60° C. The solution is heated while stirring. On diluting with alcohol a test portion of the green solution turns blue. When heated to higher temperatures the solution grows darker. The temperature is elevated to 150° C. while stirring for 40 minutes whereby hydrogen chloride is evolved. When the evolution has come to an end, the color has changed to dark red violet. A thin layer of the solution shows a blue coloration. On diluting with alcohol a test portion turns cherry red. After cooling the solution is poured into dilute hydrochloric acid. The nitrobenzene is blown off by means of steam, the dyestuff filtered with suction and washed until its reaction is neutral. It dissolves in sulfuric acid with a blue coloration. It is then finely dispersed in water and an alkaline solution of sodium hypochlorite is added until a test portion taken from the liquor dissolves in sulfuric acid with a cherry red coloration. The dyestuff is then filtered with suction, washed and dried. It is identical with that obtained according to Example 1 and dyes fibres the same reddish brown shades from the vat.

200 parts of anhydrous aluminium chloride in 600 parts of dry nitrobenzene
at 40° C. while stirring. The temperature rises to 60° C. A green solution is obtained which turns brown on dilution with alcohol. The solution is stirred for half an hour at 60° C. and then poured on ice water with the addition of some hydrochloric acid. The nitrobenzene is blown off by means of steam, the precipitate filtered with suction, finely triturated, pasted with water, then oxidized with an alkaline solution of sodium hypochlorite in small excess, filtered with suction, washed and dried. It dissolves in concentrated sulfuric acid with a clear blue coloration and dyes vegetable fibers from a red brown vat deep black brown.

Example 11

40 parts of anthraquinone-2.1-(N)-1'.2'-(N)-3'.6'-dichloroacridone
12 parts of 1.5-diaminoanthraquinone
8 parts of potassium carbonate
2 parts of copper acetate and
400 parts of naphthalene
are heated to 210° C. for three and a half hours while stirring. The dianthrimide, which already separates while heating, is isolated in the usual manner. It forms black needles, which dissolve in concentrated sulfuric acid with a brownish-yellow coloration.

40 parts of the above anthrimide are stirred into a solution of 120 parts of anhydrous aluminium chloride in 360 parts of dry nitrobenzene at a temperature of 60° C. A test portion of this solution shows when diluted with alcohol a clear green coloration. The temperature is then raised to 90° C. whereupon the ring closure occurs with self-heating. Heating is continued for another hour to about 95° C., after which time a test portion diluted with alcohol is of a violet blue coloration. With the addition of some hydrochloric acid, the solution is poured on ice water, the nitrobenzene is blown off by means of steam, the dyestuff filtered off and washed neutral. It is mixed with water and 30 parts of dilute caustic soda solution, oxidized by the addition of 20 parts of a sodium hypochlorite solution and isolated in the usual manner. After drying, the dyestuff forms a black powder, which is difficultly soluble in concentrated sulfuric acid with a blue coloration and dyes the fiber from a brown vat strong and very fast red brown shades. The dyestuff corresponds to the following formula:—

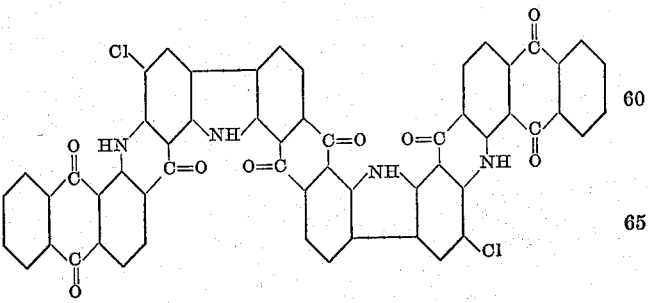

Example 10

70 parts of the anthrimide from anthraquinone-2.1-(N)-1'.2'-(N)-3'-methoxy-6'-chlorobenzene acridone and 1-amino-5-benzoylamino-anthraquinone are finely powdered and introduced into a solution of

Example 12

90 parts of anthraquinone-2.1-(N)-1'.2'-(N)-3'-phenoxy-6'-chlorobenzene acridone (obtainable by the action of 1-chloro-anthraquinone-2-carboxylic acid on 2-amino-4-chloro-diphenyl-ether and treating the 1-(ortho-phenoxy-metachloro-aniline) anthraquinone-2-carboxylic acid with ring-closing agents), 50 parts of alpha-aminoanthraquinone
14 parts of potassium carbonate
4 parts of copper acetate
300 parts of naphthalene are heated while stirring to 220° C. for two and a half hours. The working up and the isolation of the Bz-6'-anthrimide is performed as described in the preceding examples. The anthrimide obtained forms bluish-black needles.

For the conversion into the carbazole 150 parts of the anthrimide are introduced into a solution of
450 parts of anhydrous aluminium chloride in
1400 parts of nitrobenzene while stirring at 60° C. The temperature rises by self-heating to 70° C. and is kept at this degree for about half an hour. The solution assumes a bluish-green coloration and a test portion turns to red-violet when diluted with alcohol. The melt is now distributed with water to which a small amount of hydrochloric acid has been added, and the nitrobenzene is blown off by means of steam. The dyestuff is sucked off, washed neutral, pasted with water and after the addition of an excess of a caustic soda solution it is oxidized with a sodium hypochlorite solution. The dyestuff is then sucked off again, washed and dried. It forms a blackish-brown powder, being insoluble in organic solvents, soluble in concentrated sulfuric acid with a cherry red coloration and dyeing vegetable fibers from a reddish brown hydrosulfite vat dark brown shades, which are of a more reddish tint than those obtainable from the dyestuff described in Example 3. The dyestuff is also very suitable for printing purposes (according to the sodium formaldehyde sulfoxylate-potash process) and yields prints of an excellent fastness to chlorine, boiling and light.

Example 13

40 parts of anthraquinone-2.1-(N)-1'.2'-(N)-3'.6'-dichlorobenzene acridone (compare Example 1)
28 parts of 1-amino-6-chloroanthraquinone
3 parts of potash
1.5 parts of copper acetate and
400 parts of naphthalene are heated while stirring to 210° C. for two and a half hours. The melt is worked up as described in Example 1. The anthrimide obtained forms a dark crystalline powder, dyeing cotton from a hydrosulfite vat fast dark blue shades.

For the conversion into the carbazole 100 parts of the above anthrimide are dissolved a solution of
300 parts of aluminium chloride in
900 parts of nitrobenzene at about 55° C. A test portion of this solution turns blue on the addition of some alcohol. The melt is heated while stirring to 90° C. for 25 minutes and kept at this temperature for another 25 minutes. The solution is of a dull green blue coloration and a test portion shows on diluting with alcohol a cherry red tint. Thereupon ice water, being acidified by means of hydrochloric acid, is stirred in and the nitrobenzene is blown off with steam. The residue is sucked off and washed neutral. It forms a brownish-black crumbly mass, in which the carbazole is contained in partly reduced form, still including aluminium and being easily vattable. A test portion being carefully dried dissolves in sulfuric acid with a blue coloration. When mixing the still wet mass with a suitable pasting agent, for example, glycerine, a paste is obtained, which yields in the sodium formaldehyde sulfoxylate-potash printing process excellent brown prints of very good fastness properties.

The conversion into the final product is performed by oxidizing the finely distributed wet mass in a suitable manner, for example, by mixing it with very dilute caustic soda solution and the necessary amount of sodium hypochlorite solution or by vatting it with hydrosulfite and caustic soda solution and the necessary amount of warm water and oxidizing the vat with air. After drying the dyestuff forms a dark brown powder, which easily dissolves in concentrated sulfuric acid with a cherry red coloration and dyes vegetable fibers from a red brown hydrosulfite vat reddish-brown shades of excellent fastness properties.

Example 14

39 parts of anthraquinone-2.1-(N)-2'.1'-(N)-3'-methoxy-6-chlorobenzene acridone (compare Example 3)
30 parts of 1-amino-6.7-dichloro-anthraquinone
7 parts of finely powdered anhydrous potash
2.25 parts of copper acetate and
400 parts of naphthalene is heated to 210° C. for 2 hours while stirring. The working up of the melt is performed as described in Example 1. The anthrimide obtained forms a dark brown crystalline powder, which is soluble in sulfuric acid monohydrate with a yellow brown coloration, the solution gradually assumes a dark red color on heating on the water bath, and, when pouring the melt into water, a yellow red dyestuff separates.

50 parts of the above anthrimide are introduced into a solution of 150 parts of anhydrous aluminium chloride in 400 parts of nitrobenzene at 60° C. and while stirring, whereby the temperature raises by selfheating to 80° C. Stirring is continued at this temperature, until a test portion shows on dilution with alcohol a violet-red color and maintains this shade for about a quarter of an hour. The solution is then poured into water, to which hydrochloric acid has been added, whereupon the nitrobenzene is blown off by means of steam. The dyestuff is sucked off, washed neutral, finely milled and pasted with water, rendered alkaline by adding sodium hydroxide, mixed with a slight excess of sodium hypochlorite solution, stirred for one hour, filtered off with suction, rinsed and dried. It forms a dark brown powder, which is nearly insoluble in organic solvents but easily soluble in concentrated sulfuric acid with a cherry red coloration. It dyes vegetable fibers from its red brown alkaline hydrosulfite vat after oxidation fast dark brown shades, which are of a somewhat more reddish shade than those obtainable with the dyestuff described in Example 3.

Example 15

39.4 parts of anthraquinone-2.1-(N)-1'.2'-(N)-4'.6'-dichlorobenzene acridone (obtainable from 3.5-dichloroaniline according to the process of German Patent 237,238)
28.5 parts of 1-amino-6-chloroanthraquinone
8.0 parts of anhydrous potash
1.5 parts of copper acetate and
400.0 parts of naphthalene are heated to 210° C. while stirring for 2–3 hours. The working up is performed as described in Example 1. The anthrimide obtained is a dark crystalline powder, dyeing cotton from a hydrosulfite vat corinth shades of good fastness to chlorine and boiling.

100 parts of the above anthrimide are introduced into a solution of
300 parts of anhydrous aluminium chloride in
900 parts of nitrobenzene at 55° C. The temperature rises to 65° C. Heating is then continued to 85° C. for one hour while stirring, whereby the solution being firstly green changes to blue. The melt is then poured into acidified ice water, the nitrobenzene blown off by means of steam and the wet dyestuff is pasted with some glycerine. It yields in the sodium formaldehyde sulfoxylate-potash printing process very abundant clear, yellowish-brown prints of excellent fastness to chlorine, light and boiling. The dried dyestuff dissolves in concentrated sulfuric acid with a blue coloration and yields a brownish red vat. When mixing the dyestuff with water to form a paste and oxidizing it with a sodium hypochlorite solution, it forms after isolation a dark powder, dissolving in concentrated sulfuric acid with red coloration and dyeing from the vat the same shades as the intermediate product.

When substituting in the above example for the 1-amino-6-chloroanthraquinone the equivalent amount of 1-amino-6.7-dichloroanthraquinone, a similar dyestuff is obtained of a somewhat clearer and more yellowish shade.

I claim:—

1. The process which comprises causing metal halogenides selected from the group consisting of aluminium halogenides and ferric halogenides in the presence of organic non-basic solvents which are capable of dissolving said metal chlorides, to react upon anthraquinone-2.1-(N)-benzene acridones which have an 1-aminoanthraquinonyl radical in 6-position of the benzene nucleus.

2. The process which comprises causing an aluminium halogenide in the presence of an organic non-basic solvent which is capable of dissolving the same to react upon anthraquinone 2.1-(N)-benzene acridones which have an 1-amino-anthraquinonyl radical in 6-position of the benzene nucleus, and reacting with inorganic oxidizing agents upon the hydro compounds thus formed.

3. The process which comprises causing metal halogenides selected from the group consisting of aluminium halogenides and ferric halogenides in the presence of organic non-basic solvents which are capable of dissolving said metal chlorides, to react upon compounds of the following formula:—

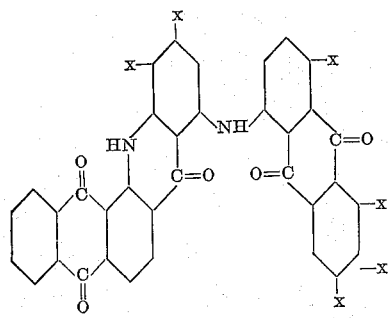

wherein not more than 3 of the hydrogen atoms in the position $x$ are replaced by substituents selected from the group consisting of halogen atoms, alkyl-, alkoxy- or phenoxy groups.

4. The process as claimed in claim 1, wherein nitrobenzene is employed as organic non-basic solvent.

5. The process as claimed in claim 3, wherein nitrobenzene is employed as organic non-basic solvent.

6. The process as claimed in claim 1, wherein tetrachloroethane is employed as organic non-basic solvent.

7. The process as claimed in claim 3, wherein tetrachloroethane is employed as organic non-basic solvent.

8. The hydrocompounds which are identical with those obtainable by the process which comprises causing aluminium halogenides in the presence of non-basic organic solvents which are capable of dissolving said metal halogenides to react upon anthraquinone-2.1-(N)-benzene acridones, which have an 1-aminoanthraquinonyl radical in 6-position of the benzene nucleus, the said compounds having the probable formula:—

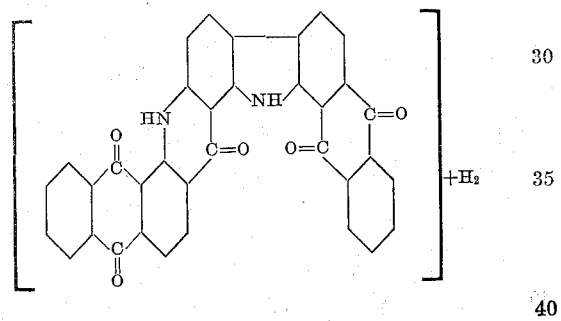

which indicates that the positions of the excess hydrogen atoms are unknown, these hydro compounds having a small content of aluminium halogenide, showing a blue coloration upon dissolving in concentrated sulfuric acid, and yielding from the red brown hydrosulfite vat fast brown shades.

9. The hydro compounds which are identical with those obtainable by the process which comprises causing aluminium halogenides in the presence of non-basic organic solvents which are capable of dissolving said metal halogenides to react upon compounds of the following formula:—

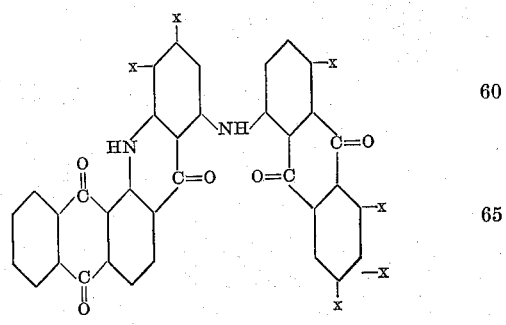

in which formula not more than 3 of the hydrogen atoms in the positions $x$ are replaced by substituents selected from the group consisting of halogen atoms, alkyl-, alkoxy- and phenoxy groups, these hydro compounds having the probable formula:—

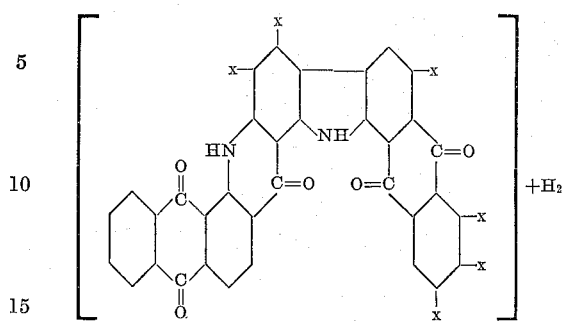

which indicates that the positions of the excess hydrogen atoms are unknown and wherein the $x$'s have the above meaning, these hydro compounds having a small content of aluminium halogenide, showing a blue coloration upon dissolving in concentrated sulfuric acid, and yielding from the red brown hydrosulfite vat fast brown shades.

10. The new compounds which are identical with those obtainable by the process which comprises causing a metal halogenide selected from the group consisting of aluminium and ferric halogenides in the presence of non-basic organic solvents to react upon compounds of the following formula:— in which formula not more than 3 of the hydrogen atoms in the positions $x$ are replaced by substituents selected from the group consisting of halogen atoms, alkyl-, alkoxy- and phenoxy groups, and reacting with inorganic oxidizing agents upon the hydro compounds which may be formed as intermediates, these new compounds having the probable formula:— wherein the $x$'s have the above meaning, and being dark powders, insoluble in water, alkalies and mineral acids, difficultly soluble in organic solvents of high boiling point at elevated temperatures, showing a blue to bluish-red coloration upon dissolving the same in concentrated sulfuric acid and yielding from the red brown hydrosulfite vat fast brown shades.

WILHELM BAUER.